United States Patent [19]

Priem et al.

[11] Patent Number: 5,070,443
[45] Date of Patent: Dec. 3, 1991

[54] APPARATUS FOR WRITE HANDSHAKE IN HIGH-SPEED ASYNCHRONOUS BUS INTERFACE

[75] Inventors: Curtis Priem, Fremont; Chris Malachowsky, Santa Clara, both of Calif.

[73] Assignee: Sun Microsystems, Inc., Mountain View, Calif.

[21] Appl. No.: 405,544

[22] Filed: Sep. 11, 1989

[51] Int. Cl.⁵ .............................................. G06F 15/16
[52] U.S. Cl. .................................. 395/725; 364/228.5; 364/229.1; 364/260.1; 364/270.7; 364/DIG. 1; 364/240.1
[58] Field of Search ... 364/200 MS File, 900 MS File

[56] References Cited

U.S. PATENT DOCUMENTS

| | | | |
|---|---|---|---|
| 3,975,712 | 8/1976 | Hepworth et al. | 371/49.1 |
| 3,979,732 | 9/1976 | Hepworth et al. | 364/200 |
| 4,488,226 | 12/1984 | Wagner et al. | 364/200 |
| 4,873,703 | 10/1989 | Crandall et al. | 375/118 |
| 4,897,779 | 1/1990 | Dickson et al. | 364/200 |

*Primary Examiner*—Michael R. Fleming
*Assistant Examiner*—Robert S. Hauser
*Attorney, Agent, or Firm*—Blakely Sokoloff Taylor & Zafman

[57] ABSTRACT

Write handshake circuitry for an asynchronous bus interface system transferring data between sending and receiving computer systems including apparatus for providing a pre-acknowledge signal during the idle condition of the interface system to indicate to the sending computer system that the receiving system is ready to accept data, apparatus for synchronizing the pre-acknowledge signal to the clock of the sending computer system during the idle condition of the interface system, apparatus for providing a write signal from the sending computer system to indicate to the receiving computer system that the sending computer system is writing to the receiving computer system, and apparatus in the receiving system for receiving and synchronizing data upon the appearance of the write signal.

6 Claims, 6 Drawing Sheets

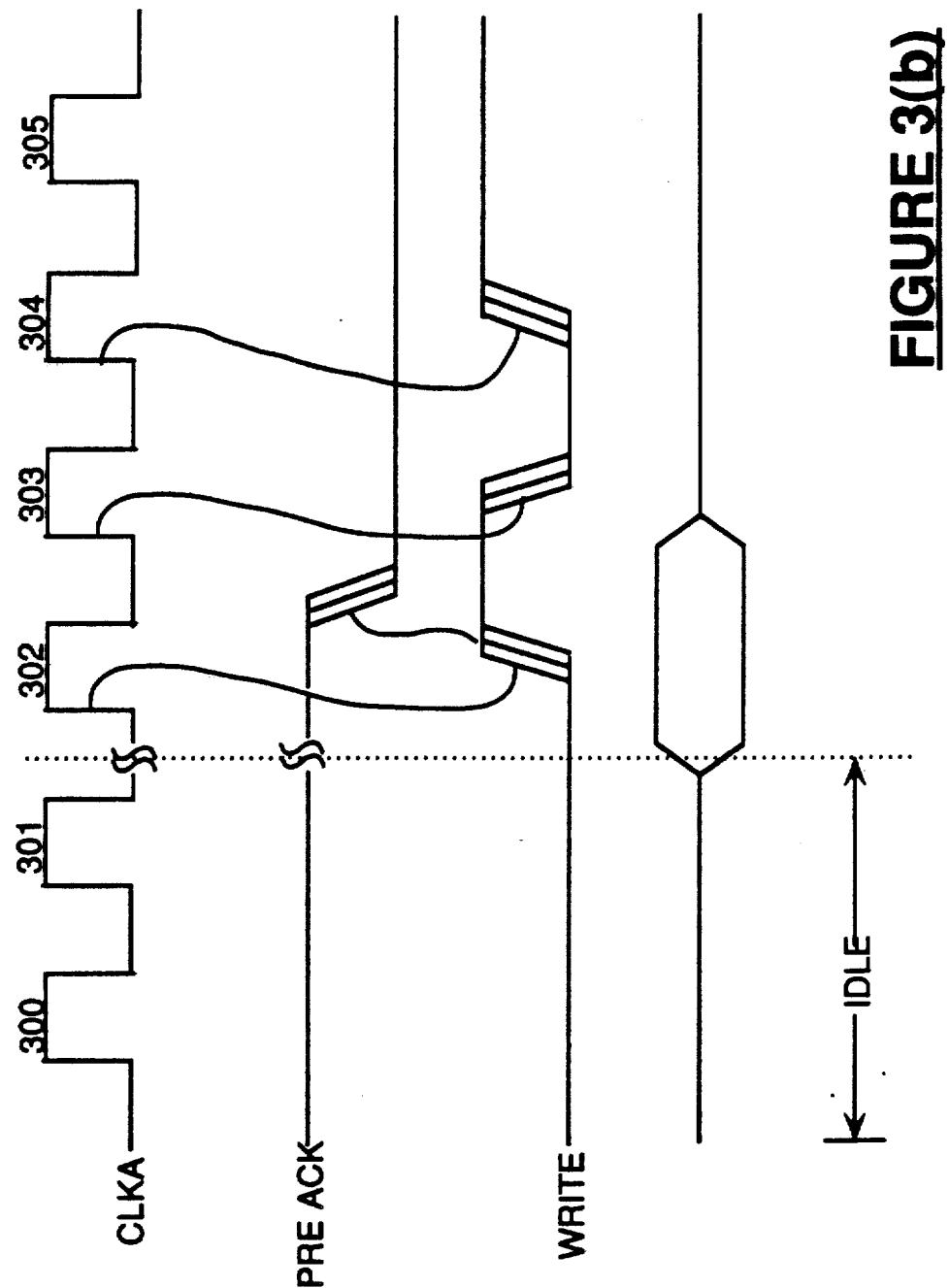

APPARATUS FOR WRITE HANDSHAKE IN HIGH-SPEED ASYNCHRONOUS BUS INTERFACE

BACKGROUND OF THE INVENTION

1. Field of the Invention

This invention relates to computer circuitry and, more particularly, to handshake interface circuitry for connecting asynchronous components to a computer bus.

2. History of the Prior Art

The typical interface system for transferring information between two computer systems is a synchronous interface system, one which drives the two systems off the same clock. Joining the two systems is usually a data bus for carrying information, an address bus for carrying addresses, and various control lines including lines for accomplishing a so-called "handshake" between the two systems. Normally a write line, a read line, and an acknowledge line are required for transferring control signals between the two systems to accomplish the handshake.

In the normal synchronous interface where both computer systems are running on the same clock, a computer system wishing to write to a second system provides a write signal on the write line. The second system samples the write line connecting the two systems to detect the write signal and, in response to that signal, receives the data on the data bus and returns an acknowledge pulse on the acknowledge line to indicate that the data has been received. Each of the signals on the handshake lines is driven by the system clock and, in a preferred embodiment, occurs on the rising edge of the system clock pulse. Consequently, the handshaking operation in a synchronous system where the same clock controls both systems usually requires one clock period for the write signal to be driven onto the write line, and a second clock period for the second system to sense the appearance of the write signal on the write line and to acknowledge receipt of the information by placing the acknowledge signal on the acknowledge line. Moreover, before additional information may be written through the interface system, a third clock period is necessary to terminate the original write signal; and a fourth clock period is required to terminate the acknowledge signal. Consequently, a write handshake procedure in the normal synchronous computer interface may take as long as four clock periods.

At an asynchronous interface where the two systems joined by the bus operate at different clock frequencies, it is necessary that the incoming and outgoing handshake signals be synchronized to each of the two systems as they travel in each direction. Consequently, an incoming write signal must be synchronized to the clock of the receiving system while the outgoing acknowledge signal must be synchronized to the clock of the sending system. The normal manner in which this is accomplished by the prior art is to use two stages of flip-flops on each handshake line, each stage being driven by the clock of the system receiving the particular signal. An incoming signal causes the first stage flip-flop to begin switching; and, because of the timing differential between the clock pulse of the receiving system and the incoming signal, the first flip-flop may assume a metastable condition, erratically switching between states until finally settling into one of the two possible states. However, the final output of the first flip-flop causes the second flip-flop to take a state thereby isolating the dithering from the receiving system. The use of two stages of flip-flops to receive the handshake signals adds at least two additional clock periods to each step of the synchronization in an asynchronous interface of the prior art.

There have been asynchronous interface systems designed which utilize latches to receive the incoming information at the second system so that data may be immediately transferred between the systems without synchronization. However, such latches do not eliminate the need to synchronize the information to the clock of the receiving system but merely delay the time at which the synchronization of the information must occur. It merely moves the bottleneck from the interface circuitry to some later stage of the receiving system where, in fact, two stages of synchronization are still necessary before the data may be utilized.

SUMMARY OF THE INVENTION

It is an object of the present invention to speed the operation of asynchronous interfaces connecting different systems on a computer bus.

It is another object of the present invention to provide asynchronous interface systems for computer buses which operate more rapidly to accomplish a handshake than do synchronous systems of the prior art.

These and other objects of the invention are realized in a write handshake circuitry for an asynchronous bus interface system transferring data between sending and receiving computer systems which includes apparatus for providing a pre-acknowledge signal during the idle condition of the interface system to indicate to the sending computer system that the receiving system is ready to accept data, apparatus for synchronizing the pre-acknowledge signal to the clock of the sending computer system during the idle condition of the interface system, apparatus for providing a write signal from the sending computer system to indicate to the receiving computer system that the sending computer system is writing to the receiving computer system, and apparatus in the receiving system for receiving data upon the appearance of the write signal.

These and other objects and features of the present invention will be better understood by reference to the detailed description which follows, taken together with the drawings in which like elements are referred to by like designations throughout the several views.

BRIEF DESCRIPTION OF THE DRAWINGS

FIG. 3(b) illustrates a timing diagram for the operation of the interface system shown in FIG. 3(a).

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

Throughout this specification where a computer system is referred to, it should be understood that the term is intended to include circuitry often referred to as central processing systems, co-processing systems for assisting central processing systems such as in mathematical manipulations, graphical accelerators, and the like as well as complete independent computer systems.

DESCRIPTION OF THE PREFERRED EMBODIMENT

Figure 1A:
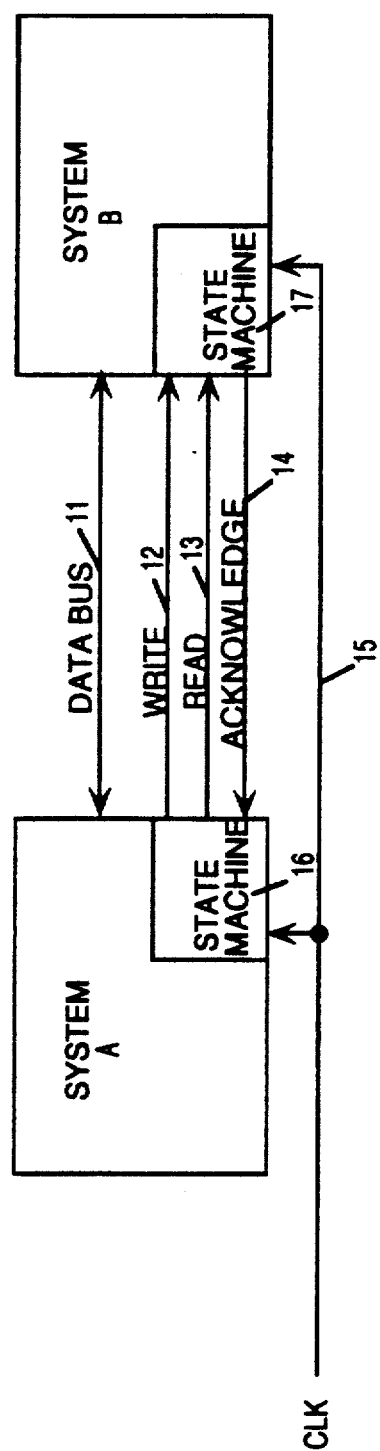
FIG. 1(a) is a block diagram illustrating an interface system for connecting together two systems running synchronously.

FIG. 1(a) is a block diagram illustrating a full handshake operation at a synchronous interface system of the prior art for connecting together two systems running on the same clock. System A and System B are connected together by a data bus 11 which, in the more popular computer systems, may comprise thirty-two lines for carrying data. Also connecting system A to system B are a write line 12, a read line 13, and an acknowledge line 14. A system clock appears on line 15 and is furnished to state machines 16 and 17 which control the handshake operation between System A and System B. As used in the present disclosure, state machine refers to a digital logic state machine, a processor such as a central processing unit, or some other circuitry providing control functions. Not shown in FIG. 1(a) because it is not necessary to the description, is an address bus for conveying addressing information between the systems A and B.

Figure 1B:
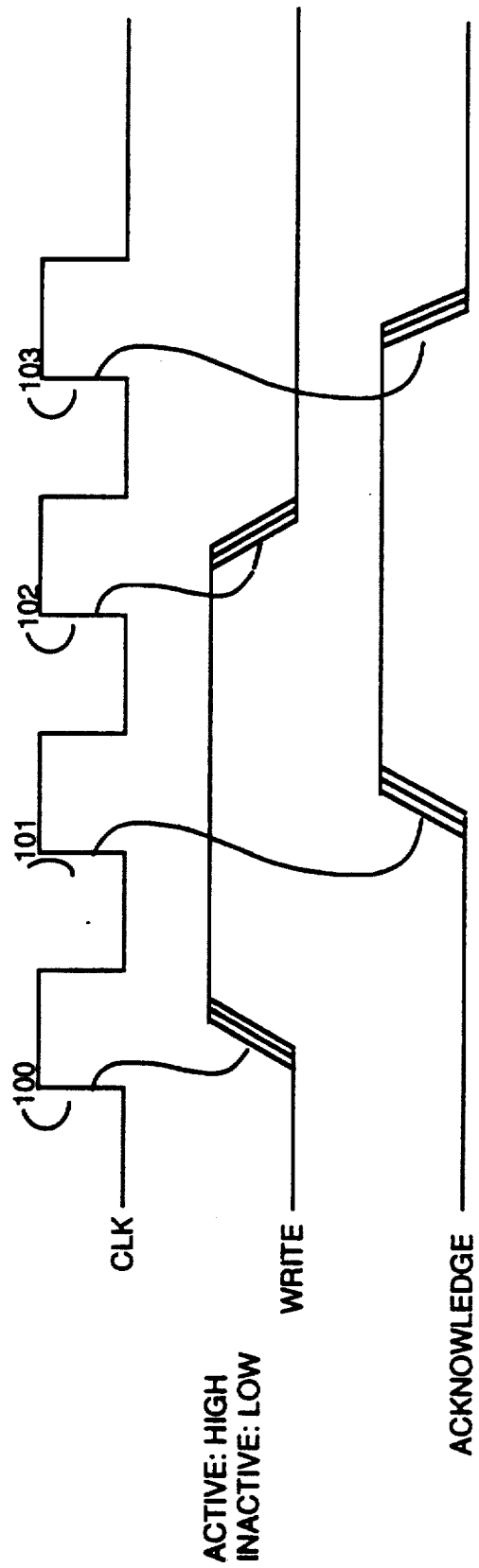
FIG. 1(b) is a timing diagram illustrating the signals utilized in the handshake operation for the interface system illustrated in FIG. 1(a).

FIG. 1(b) is a timing diagram which illustrates the signals utilized in the handshake operation by the interface system of FIG. 1. These include a clock signal which is furnished to each of the state machines 16 and 17 of System A and System B on the clock line 15, a write signal provided on the write line 12, and an acknowledge signal provided on the acknowledge line 14. Also included in the normal interface but not shown in FIG. 1(a) are control lines for transferring write, read, and acknowledge signals in the opposite direction for write and read operations initiated by the system B. In order to accomplish a write operation in a synchronous system, a write signal is provided by the state machine 16 on the write line 12 following the rising edge of the first clock pulse 100. At the rising edge of the second clock pulse 101, this write signal is sampled by the state machine 17 of System B. At some point, depending on the particular system, the data is placed on the data bus 11 and written to system B. On the rising edge of the second clock pulse 101, an acknowledge signal is sent by the state machine 17 indicating the receipt of the write signal and the understanding that the information is being transferred on the data bus 11. The receipt of the acknowledge signal by the state machine 16 of system A allows the termination of the write signal to occur following the leading edge of the next clock pulse 102; and, finally, the acknowledge signal may be terminated following the leading edge of the next clock pulse 103. As may be seen, a substantial amount of system time is required to accomplish the handshake even on a synchronous system.

Figure 2A:
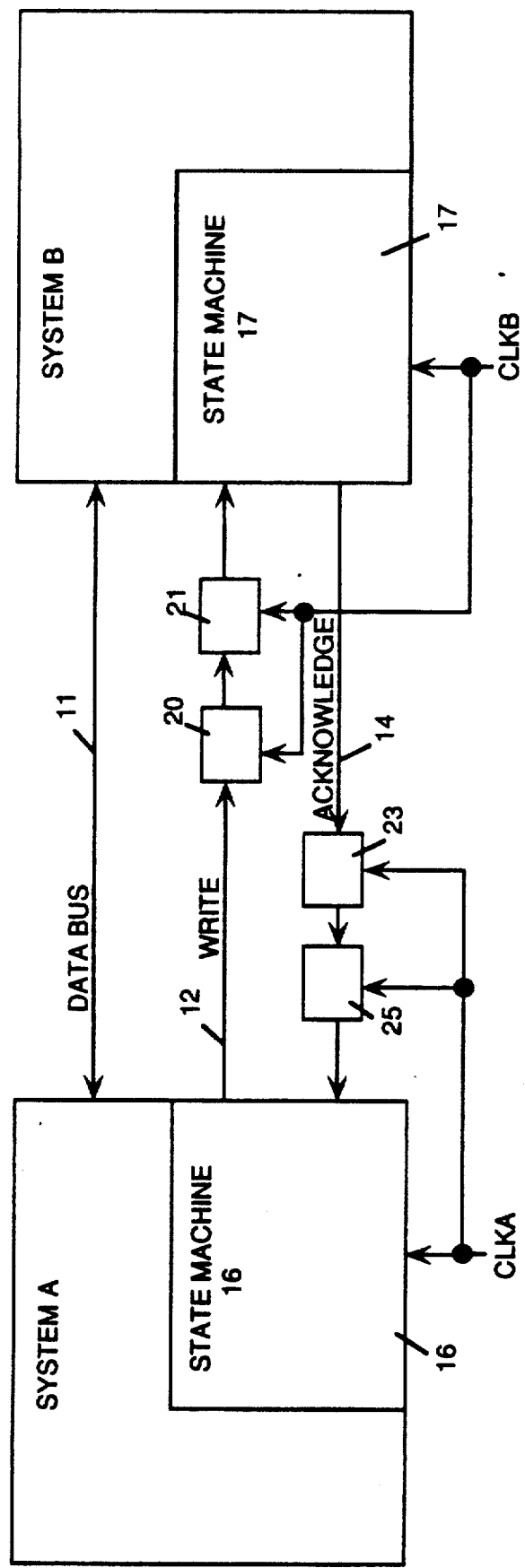
FIG. 2(a) illustrates in block diagram form circuitry for accomplishing the transfer of information in the handshake operation in between two asynchronous systems.

FIG. 2(a) illustrates in block diagram form circuitry of the prior art for accomplishing the handshake operation between two asynchronous systems, i.e., systems running on different system clocks. In FIG. 2(a), system A receives and operates in a response to a first clock A while system B receives and operates in response to a second clock B. System A is joined to system B by data bus 11 and has write line 12, a read line (which is not shown because it is not pertinent to this discussion), and acknowledge line 14 for accomplishing the handshake between the two systems. Also included in the normal interface but not shown in FIG. 2(a) are similar control lines for transferring write, read, and acknowledge signals in the opposite direction for write and read operations initiated by the system B and an address bus for transferring address information between systems A and B.

Because the two systems A and B are driven by two different clocks, signals which are sent from system A appear at one rate but can be used at system B only at a second rate. Thus, it is necessary to synchronize the signals transferred between the two systems. In order to accomplish the synchronization of the handshake signals between the two systems A and B, two flip-flops are placed in each control line between the systems. When the state machine 16 of system A places a write signal on write line 12, the write signal on write line 12 is transferred to a first flip-flop 20 which is driven by clock B. The write signal is transferred from flip-flop 20 to flip-flop 21 which is also driven by clock B and then to the state machine 17 of system B.

The acknowledge signals placed on the acknowledge line 14 by the state machine 17 of system B are directed to a first flip-flop 23 driven by clock A. The output of the flip-flop 23 furnished to a second flip-flop 25 also driven by clock A. The flip-flop 25 furnishes an output to the state machine of the system A.

Figure 2B:
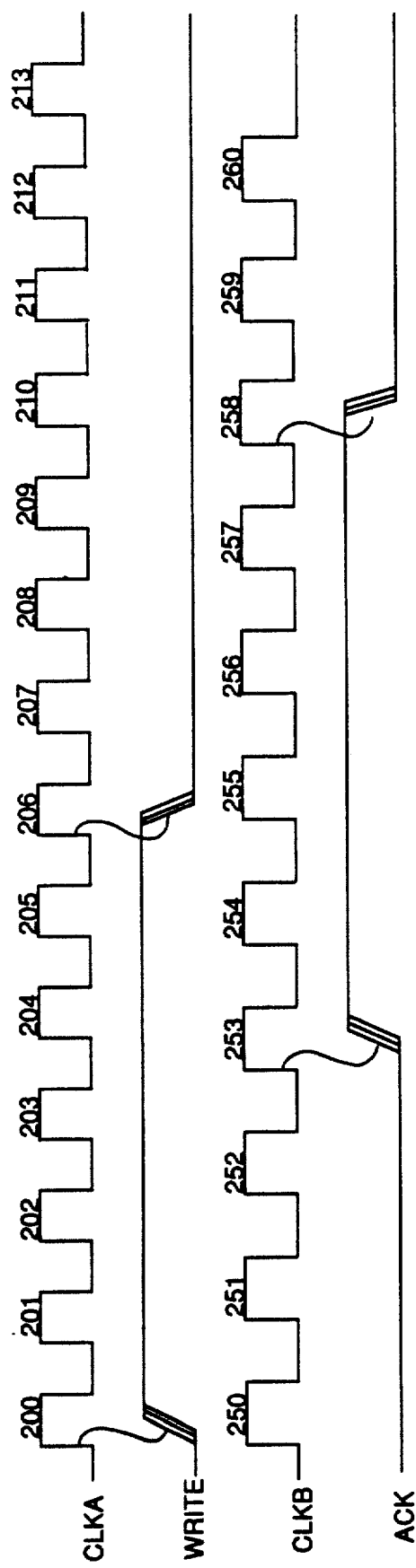
FIG. 2(b) illustrates a timing diagram showing the signals utilized for accomplishing a handshake in an asynchronous write handshake operation as shown in FIG. 2(a).

FIG. 2(b) is a timing diagram showing the signals utilized for accomplishing an asynchronous write handshake operation between system A and system B illustrated in FIG. 2(a). The signals shown are clock A, the write signal, clock B, and the acknowledge signal.

On the rising edge of the first clock pulse 200 of clock A, the write signal is driven active on the write line 12. On the second clock pulse 251 of clock B, the write pulse is provided to the first flip-flop 20 which attempts to assume a state. In fact, the particular state the flip-flop 20 actually takes will depend on the timing of the appearance of the write signal and of the clock pulse; the first flip-flop 20 may, in fact, assume a metastable condition, erratically switching between one or the other of the two possible states and finally settling into one of the state. If there is sufficient set-up time and hold time for the incoming write signal to stabilize at the input to the flip-flop 20 at the time the clock pulse is received, the flip-flop 20 will switch; and the write signal will be synchronized with the clock of the system B. Ultimately the flip-flop 20 will assume one or the other of its two states. If this the correct state, the write signal will be synchronized with the clock of the system B. If not, the next clock will set the flip-flop 20 to synchronize the write signal although one clock period will have been lost. Whatever condition the flip-flop 20 settles into, on the rising edge of the third clock pulse 252 of clock B, the flip-flop 20 provides an output to the second flip-flop 21 causing the flip-flop 21 to take a state depending on the state assumed by the first flip-flop 20. The flip-flop 21 is arranged in the path in order to isolate the erratic switching of the flip-flop 20 from the state machine 17 of the receiving system B. The use of two stages of flip-flops to receive the handshake signals adds at least two additional clock periods to each step of the synchronization in an asynchronous interface designed in accordance with the prior art. Assuming flip-flop 20 was properly set on clock 251, on the rising edge of the fourth clock pulse 253 of clock B, the write signal is sychronized to the clock of system B, and the state machine 17 may sample the write line and provide an acknowledge pulse on the acknowledge line 14.

In a similar manner, the acknowledge signal is provided by the state machine 17 to the first flip-flop 23 on the acknowledge line 14 on the rising edge of the fifth clock pulse 204 of clock A. After synchronization in the manner discussed about, a correctly synchronized output of the flip-flop 23 is provided to the second flip-flop 25 on the rising edge of the sixth clock pulse 205 of clock A. Finally, on the rising edge of the seventh clock pulse 206 of clock A, the acknowledge signal may be sampled by the state machine A of system A; and the write pulse driven negative (deasserted) on the write line 12.

When the write signal is deasserted on the write line 12, it will cause the first flip-flop 20 to attempt to assume a state on the rising edge of the seventh clock pulse 256 of clock B and the second flip-flop 21 to assume a state on the rising edge of the eighth clock pulse 257 of clock B. Finally, on the rising edge of the ninth clock pulse 258 of clock B, the state machine 17 may deassert the acknowledge signal on the acknowledge line 14. The deassertion of the acknowledge signal causes the attempted change of state of the flip-flop 23 on the rising edge of the eleventh clock pulse 210 of clock A and a change of state of flip-flop 25 on the rising edge of the twelfth clock pulse 211 of clock A. Finally, the state machine 16 of system A samples the deassertion of the acknowledge signal on the rising edge of the thirteenth clock pulse 212 of clock A.

It will be understood by those skilled in the art reviewing the typical operation of the prior art interface system just described for connecting asynchronous systems to transmit information to one another, that the full write handshake operation for such an asynchronous system requires a substantial period of time, much longer than the time required for accomplishing the same handshake operation in a synchronous system.

The system of the present invention overcomes the problems of the prior art for transferring write handshake information between first and second asynchronously running systems A and B by providing an acknowledge line which is normally held in the high condition to indicate that the data may be immediately accepted for a write operation. In fact, it is the normal condition of the interface system that the second system B is able to immediately accept information written to it from the first system A. Since the acknowledge signal occurs in the normal condition of the interface before a write signal is transferred from the first system A to the second system B, the synchronization of the acknowledge signal will already have been accomplished. Thus, a sampling of an acknowledge signal on the acknowledge line by the state machine of the system A allows a write signal to be placed on the write line immediately when a write is desired and the data to be written from system A to system B without the requirement of waiting for any synchronization of the write or the acknowledge signal to occur.

In effect, the operation of the interface circuitry provides for the handshake operation to occur between asynchronous systems without the necessity of synchronizing the handshake signals in the normal operation of the systems. The only time when handshaking is necessary is when the system to which the information is being written cannot receive the information and is unable to provide a pre-write acknowledge signal on the acknowledge line. In such a case, the normal synchronization of the write and acknowledge handshake signals are required in order to transfer the data from one system to the other. In the usual situation in a preferred embodiment of the invention, the second system is able to accept the information from the first without any delay because the second system is able to operate more rapidly than is the first system. Consequently, the requirement for a full handshake synchronization is the unusual condition.

Figure 3A:
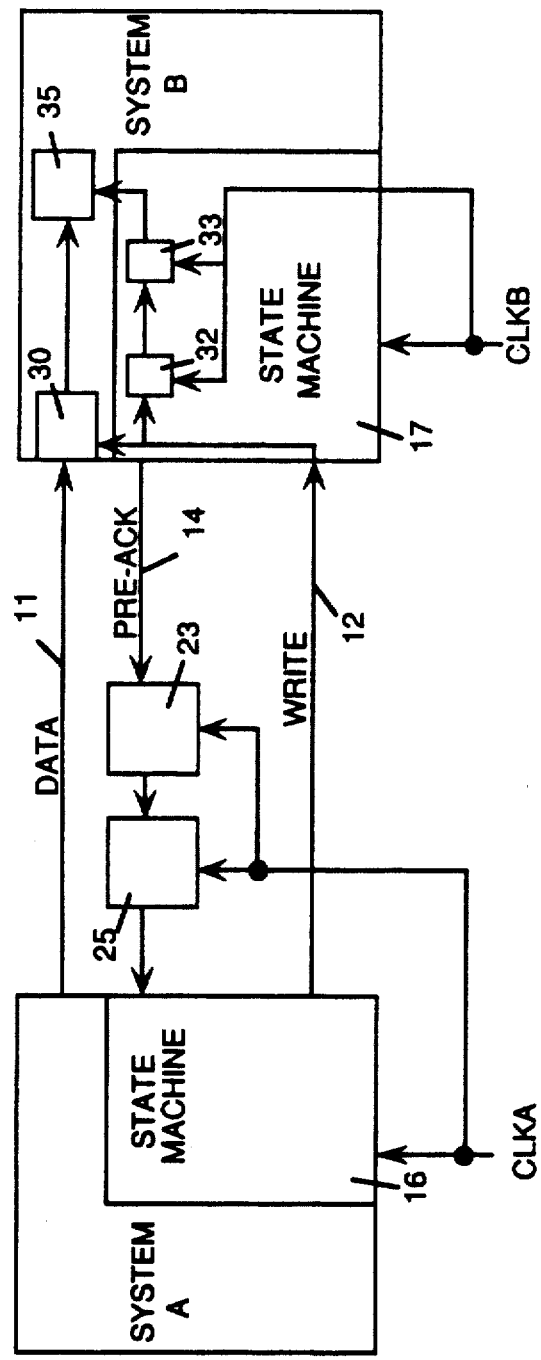
FIG. 3(a) illustrates in block diagram form an interface system constructed in accordance with the present invention.

FIG. 3(a) illustrates a system constructed in accordance with the present invention including a first computer system A and a second computer system B. The first computer system A includes a state machine 16, and the second computer system B includes a state machine 17. A clock A is furnished to the state machine 16 and to two flip-flops 23 and 25 connected to an acknowledge line 14. A write line 12 connects the state machine 16 to the state machine 17 and furnishes an input signal to a first latch register 30. A data bus 11 connects system A to system B and provides input to the first register 30. The write line 12 is also connected by a first flip-flop 32 and a second flip-flop 33 to provide input to a second latch register 35. The first flip-flop 32, the second flip-flop 33, and the second register 35 are driven by clock B. The second register 35 also receives the data furnished to the first register 30 on the data bus connecting the systems A and B. As with the systems described above, circuitry is also provided for transferring write and acknowledge signals in the opposite direction between the two systems A and B, but, being identical, is not shown in FIG. 3(a).

FIG. 3(b) illustrates a timing diagram for the operation of the circuitry shown in FIG. 3(a). In operation, during the idle state when system A is not trying to write information to system B, the acknowledge signal is asserted on line 14 and is synchronized by the first flip-flop 23 and the second flip-flop 25 to match the clock A furnished to system A. This acknowledge signal is called a pre-acknowledge signal in FIG. 3B and is shown as active or high during the idle condition. It should be noted that the synchronization of the acknowledge signal takes place during the idle state of the interface so that the acknowledge signal may be immediately read at any time by the state machine 16 of system A without further synchronization.

When data is to be written through the interface between the systems A and B, the state machine 16 samples the acknowledge line 14 at clock period 302 of clock A in FIG. 3(b). Finding the acknowledge line active, the state machine 16 immediately causes the write line 12 to go active. At the same time, the data is being transmitted on the data bus 11 to the latch register 30; and the write signal is used to clock the data into the latch register 30. Under the interface system definition, a write signal occurs when the data is ready to be sent on the data bus 11. Consequently, that data is immediately available for transfer to the register 30. Upon receipt of the write signal at state machine 17, the acknowledge signal asserted on the acknowledge line 14 may be deasserted; and, at the rising edge of the second clock period 303 of clock A, the write signal may be deasserted. At this point, although the data resides in register 30, that data has not been locked into synchronization with the clock of system B. In fact, the clock of system B has to this point not been utilized at all and only two clock periods of the system A clock have passed between the initiation and the transfer of the data from system A to system B.

Normally it would be expected that the synchronization of the data in the register 30 to the clock B of system B would require the synchronization of the acknowledge pulse with the clock of system A and the synchronization of the data with the clock of system B. However, if it can be guaranteed that the data can always be transferred from register 30 to register 35 because clock B is faster than clock A, then there is no need to deassert the acknowledge pulse on the acknowledge line 14 because register 30 will always be available to receive data appearing on the data bus 11. Consequently, the pre-acknowledge signal on the acknowledge line may remain high; and the re-synchronization of the acknowledge signal with the clock of system A need not occur. In the system with which the preferred embodiment of the invention operates, system B functions more rapidly with a faster clock than clock A so that register 35 is always ready to receive data from register 30 and the acknowledge line need never be deasserted during the normal operation of the interface system.

For a slower system B, in which it cannot be guaranteed that the data can be transferred from register 30 to register 35, a number of stages of registers or a first-in first-out (FIFO) memory with a depth equal to the ratio of clock B to clock A may be substituted for register 30 and used to pipeline the data from register 30 to register 35. In this manner, the synchronization may occur at a later time and some large number of stages of data may be shifted into the system B before any deassertion of the acknowledge signal on the acknowledge line 14 need occur. If it is necessary to synchronize the data to clock B of system B, this is accomplished by the flip-flops 32 and 33 placed to receive the input of the write line 12 between the input to register 30 and the input to register 35. These flip-flops receive clock B and require two cycles to synchronize the data in the manner discussed above. As may be seen from the timing diagram of FIG. 3(b), the change of condition of the flip-flops 32 and 33 occurs in clock periods 303 and 304 after the write signal. Consequently, in the worst case, the synchronization takes but two clock periods of the system A which is the time required to write the data to register 30 in any case. Moreover, if the acknowledge signal is deasserted because the second register cannot accept data, then this resynchronization takes but two clock periods, the same time required for writing data to register 30. Deassertion of pre-acknowledge signal is combinational off of the write pulse and is therefore synchronous with clock A. Its reassertion, however, is synchronous with clock B, thus the need for resynchronization. Consequently, no time is lost in causing the resynchronization of the system. Consequently, the interface provided by the present invention allows write handshake operations to take place in less time than the time required for the write handshake operation in the typical synchronous interface arrangement.

Although the invention has been described with reference to particular arrangements and systems, the details of those arrangements are used for illustrative purposes only and should not be considered to limit the invention. It is, thus, to be contemplated that many changes and modifications may be made by those of ordinary skill in the art without departing from the spirit and scope of the invention. The invention should therefore be considered only in terms of the claims which follow.

What is claimed:

1. An apparatus for transferring data across a bus between a first system and second system, said first system operating in accordance with a first clock and said second system operating in accordance with a second clock asynchronous to the first clock, said apparatus comprising:

a write signal line coupled between the first system and second system for asserting a write signal to the second system requesting to transfer data from the first system to the second system;

at least one data signal line coupled between the first system and second system for transferring data from the first system to the second system;

a pre-acknowledge signal line coupled between the second system and the first system for transferring a pre-acknowledge signal to the first system indicating that the second system is ready to receive data from the first system, said pre-acknowledge signal normally asserted indicating that the second system is ready to receive data, said signal deasserted only if the second system is not ready to receive data;

said first system asserting a write signal and transferring data if the pre-acknowledge signal is asserted;

said second system comprising;

a first latch register coupled to receive the data transferred by the first system across the data signal line, and coupled to the write signal line, said first latch register having a clock signal input coupled to the write signal line whereby said data is latched in accordance to the first clock when the write signal is asserted, and a second latch register coupled to receive the data latched by the first latch register, said second latch register having a clock signal input coupled to the second clock whereby the data is latched upon assertion of a clock pulse generated derived by the second clock;

whereby the number of clock signals required to transmit data between the first computer system and second computer system is minimized.

2. The apparatus as set forth in claim 1, wherein the second clock operates at a lower frequency than the first clock, said second computer system further comprising:

a first flip-flop coupled to the write signal line and having a clock input coupled to receive clock pulses generated by the second clock, to receive the write signal at the assertion of a clock pulse;

a second flip-flop coupled to the first flip-flop and having a clock input coupled to receive clock pulses generated by the second clock, to receive the write signal at the assertion of a subsequent clock pulse;

said second flip-flop further coupled to the clock input of the second latch register to output the write signal to the clock input of the second latch register;

whereby the data is synchronized to the second clock.

3. The apparatus as set forth in claim 1, wherein the second clock operates at a frequency "n" number of times slower than the first clock, and the pre-acknowledge signal is maintained asserted, said first latch register comprising a FIFO buffer having a depth equal to "n", said FIFO buffer receiving data a the first clock rate and outputting data at the second clock rate; whereby the capacity of the FIFO buffer provides for the second system to receive the transfer of data at the first clock rate without the loss of data.

4. A method for transferring data across a bus between a first system and second system, said first system operating in accordance with a first clock and said second system operating in accordance with a second clock asynchronous to the first clock, said method comprising the steps of:

transferring a pre-acknowledge signal from the second system to the first system indicating that the second system is ready to receive data from the first system, said pre-acknowledge signal normally asserted indicating that the second system is ready to receive data, said signal de-asserted only if the second system is not ready to receive data;

if the pre-acknowledge signal is asserted,
  said first system;
    transferring data across the bus, and
    asserting a write signal,
  said second system,
    latching the data transferred across the bus when the write signal is asserted into a first latch register,
    latching the data from the first latch register into a second latch register at a clock pulse subsequent to the assertion of the write signal is generated by the second lock;

whereby the number of clock signals required to transmit data between the first computer system and second computer system is minimized.

5. The method as set forth in claim 4, wherein the second clock operates at a lower frequency than the first clock frequency, said step of latching the data from the first latch register into a second latch register further comprises the steps of:

receiving the asserted write signal into a first flip-flop when a first clock pulse generated by the second clock is asserted;

transferring the asserted write signal to a second flip-flop coupled to the first flip-flop when a subsequent second clock pulse generated by the second clock is asserted;

transferring the asserted write signal from the second flip-flop to the second latch register when a subsequent third clock pulse generated by the second clock is asserted; said transferred write signal causing the second latch register to latch the data output from the first latch register;

whereby the data is synchronized to the second clock.

6. The method as set forth in claim 4, wherein the second clock operates at a frequency "n" number of times slower than the frequency of the first clock, and the pre-acknowledge signal is maintained in an asserted state, said method further comprising the steps of expanding said first latch register to be a FIFO buffer having a depth equal to "n" to store "n" transfers of data, said FIFO buffer receiving data at the first clock rate and outputting data at the second clock rate; whereby the capacity of the FIFO buffer provides for the second system to receive the transfer of data at the first clock rate without the loss of data.

* * * * *

UNITED STATES PATENT AND TRADEMARK OFFICE
CERTIFICATE OF CORRECTION

PATENT NO. : 5,070,443
DATED : December 3, 1991
INVENTOR(S) : Priem et al.

It is certified that error appears in the above-identified patent and that said Letters Patent is hereby corrected as shown below:

In column 9, claim 1 at line 12, please delete " generated ".

Signed and Sealed this

First Day of July, 1997

Attest:

BRUCE LEHMAN

Attesting Officer

Commissioner of Patents and Trademarks